UNITED STATES PATENT OFFICE.

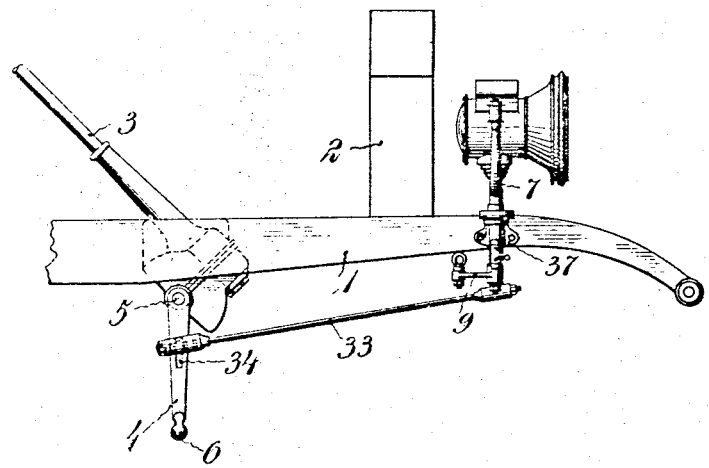
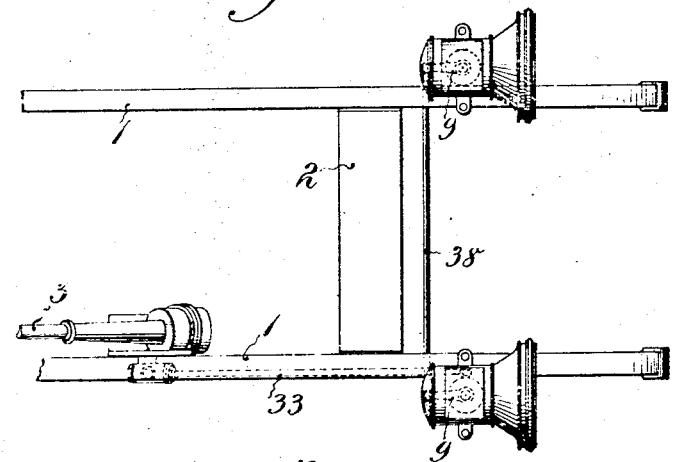
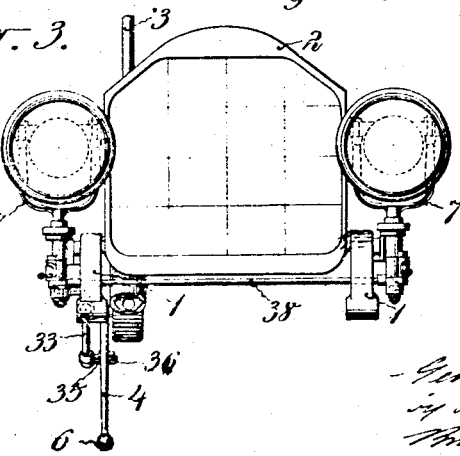

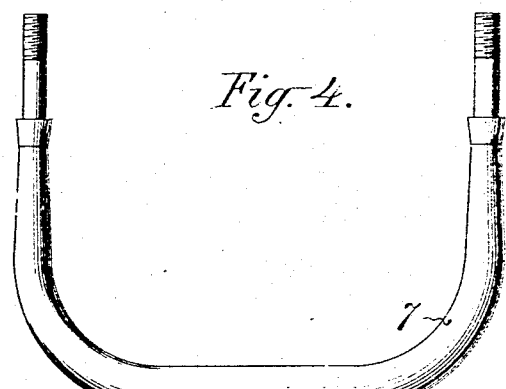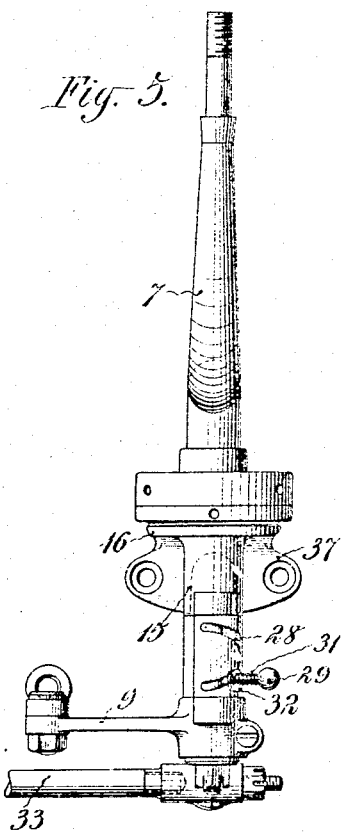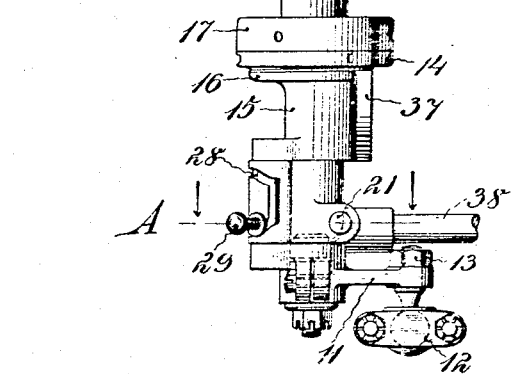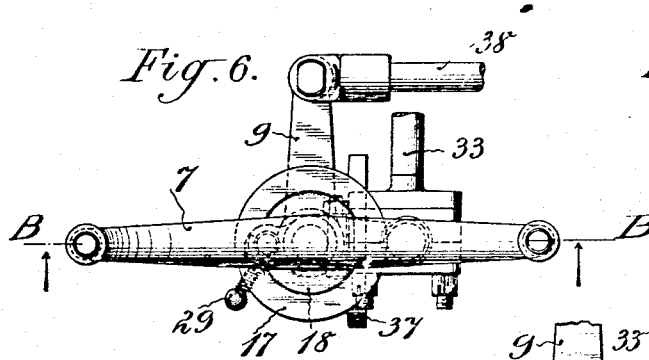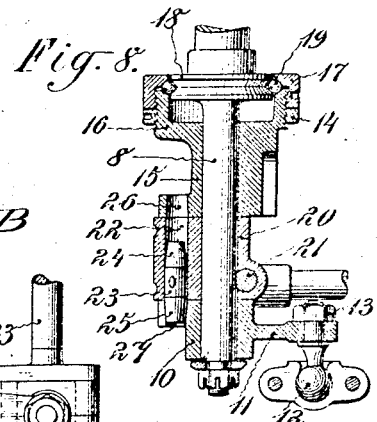

GEORGE S. SHERMAN, OF GREAT NECK, NEW YORK.

LAMP ATTACHMENT FOR VEHICLES.

933,350.
Specification of Letters Patent.
Patented Sept. 7, 1909.

Application filed December 31, 1907. Serial No. 408,786.

*To all whom it may concern:*

Be it known that I, GEORGE S. SHERMAN, a citizen of the United States, and resident of Great Neck, in the county of Nassau and State of New York, have invented a new and useful Improvement in Lamp Attachments for Vehicles, of which the following is a specification.

My invention relates to lamp attachments for vehicles and in particular to attachments for automatically swinging the head lights of automobiles with the steering traction wheels.

One object of my invention is to provide novel means for accomplishing the projection of the light in the direction the vehicle is about to take under the guiding action of the steering traction wheels.

A further object is to provide means for swinging the lamps in greater or lesser arcs than the steering traction wheels and for independently locking and releasing the lamp brackets to and from the swinging mechanism without interfering with the steering mechanism and without the necessity of disconnecting any of the parts.

A further object is to provide mechanism for directly connecting the lamp brackets to the drop arm of the steering gear.
A still further object is to provide certain improvements in the construction, form and arrangement of the various parts whereby the objects above enumerated may be obtained in a simple and effective manner.
A practical embodiment of my invention is shown in the accompanying drawings in which—

Figure 1 is a side view of my lamp attachment in position on the frame of an automobile, showing the connection between the steering gear and the lamp bracket. Fig. 2 is a top plan view of the same, Fig. 3 is a front view of the same, Fig. 4 is a front elevation of one of my lamp brackets with a portion of its rod connections, Fig. 5 is a side elevation of the same, Fig. 6 is a top plan view of the same, Fig. 7 is a horizontal section in the plane of the line A of Fig. 4, looking in the direction of the arrows, and Fig. 8 is a vertical central section in part in the plane of the line B—B of Fig. 6, looking in the direction of the arrows.

The frame of the automobile is denoted by 1 and a radiator 2 is shown in the present instance in order to indicate more clearly the relative positions of the parts to be described.

The steering gear is supported by the frame and consists of the steering post 3 and the drop arm 4, and suitable gearing connecting the two for causing the drop arm to be swung in a vertical plane on its pivot 5 by the rotation of the steering post.

The drop arm 4 is shown, in the present instance, as provided with a ball 6 at its lower end for engagement with the usual rod (not shown), connecting the steering gear with the steering traction wheels (also not shown).

The bifurcated lamp carrying member is denoted by 7 and its shank by 8. The lower end of this shank may be screw-threaded and provided with a washer and nut for retaining the parts to be hereinafter described in assembled position.

The lamp swinging member comprises the sleeve 10 and the arms 9 and 11. A ball 12 is secured by a nut 13 to the arm 11, the said ball being of the kind used for ball and socket joints. When in position, the sleeve 10 is loosely mounted on the lower portion of the shank 8, while the arm 11 extends at right angles to said shank and the ball 12 depends from the outer end of the arm 11.

The bearing support for the lamp carrying member comprises a reduced lower portion 15, and an enlarged upper portion 16. The shank 8 is loosely mounted in the lower portion 15. The upper part of the enlarged portion is of cup shape and its inner upper edge is beveled to form one part of a ball bearing. This upper part is exteriorly screw-threaded for engagement with the bearing cap 17; and the inner under edge of the said cap is also beveled to form another part of the ball bearing, so that when the cap is screwed into position on the enlarged portion, the two beveled edges above mentioned will form an annular V-shaped horizontal groove. The shank 8 has an enlarged disk-shaped portion 18 near its upper end and this portion 18 is provided with an annular V-shaped groove. When the parts are in assembled position, the two above mentioned V-shaped grooves lie in juxtaposition in the same plane and together form an annular race for the bearing balls 19, Fig. 8, and this completes the ball bearing for an antifriction support for the lamp carrying member. A lock ring 14 serves to secure the bearing cap 17 in its proper adjustment.

Secured to the shank of the lamp carrying member, intermediate the bearing support and the lamp swinging member, and forming a part of the lamp carrying member, is a sleeve 20, the means shown for securing the said sleeve to the said shank being the cotter 21 which bears against a flattened portion of the shank 8. This sleeve 20 is provided with a vertical hole 22 therethrough, offset from the shank 8 of the lamp carrying member, for carrying the double-ended locking bolt 23. The bolt 23 has tapered ends 24, 25, which are fitted to enter tapered recesses 26, 27 in the bearing support and lamp swinging member respectively, for locking either the bearing support or the lamp swinging member to the sleeve 20 at pleasure.

An elongated slot 28 is located in the wall of the sleeve 20 and its upper and lower ends are extended circumferentially toward the bearing support and the lamp swinging member respectively. The shank of the handle 29 extends through this slot 28 and is secured to the bolt 23 intermediate its tapered ends. This handle 29 is intended for the manual operation of the locking bolt for sliding it into engagement with the bearing support or the lamp swinging member as desired. The hole 22 is of sufficient length so that the locking bolt is entirely housed within it when the bolt is in its intermediate position; with the result that, in no way, can both the bearing support and the lamp swinging member be locked to the sleeve 20 at the same time by the bolt 23.

The wall of the sleeve 20 is thicker at the central part of the slot 28 than it is at either end of said slot, thus forming a cam-face on the said sleeve along the ends of the slot. The shank of the handle 29 is provided with a spiral spring 31, which is retained between the knob of the handle and the sliding washer 32. As the locking bolt is moved to its intermediate position, the washer will ride up on the thicker portion of the wall of the sleeve 20 and so compress the spring 31, while as the locking bolt is moved into either locking position and the shank of the handle 29 approaches either end of the slot 28, the spring, because of its tendency to expand, will keep the washer in snug frictional engagement with the wall of the sleeve, thus preventing any tendency on the part of the bolt to return to its intermediate position. The coöperation of the spring and cam face has also the result of tending to force the locking bolt more snugly into whichever operative position it is placed. This is a very valuable feature in connection with road vehicles which are subject to constant vibration.

A rod 33 has a ball and socket engagement with the ball 12 of the arm 11 of the lamp swinging member and the said rod extends to the drop arm 4 of the steering gear for imparting a swinging motion to the lamp swinging member by the turning of the steering wheel and the consequent swinging movement of the drop arm. This rod 33 has a pin and slot connection with the drop arm, which connection consists, in the present instance, of a radially elongated slot 34 in the drop arm through which a bolt 35 carried by the connecting rod 33, extends, a nut 36 being used for adjustably securing the bolt 35 at any desired point along the said slot. The farther away from the pivot 5 of the drop arm 4, the rod is clamped, the greater will be the swing of the lamp swinging member in proportion to any given swing of the drop arm.

I provide the bearing support with a plate 37 for securing the lamp bracket to the vehicle frame. The lamp bracket at the other side of the vehicle is constructed substantially like the one hereinabove described with the exception that the lamp swinging member does not have to have the arm 11 which is connected to the steering gear.

The arms 9 of the two lamp swinging members are connected by a cross-rod 38, so that when one of the lamp swinging members is moved by the operation of the steering gear, the other lamp swinging member will be swung correspondingly.

In operation, when it is desired to swing both of the lamps simultaneously, the bolts 23 are both forced downwardly into position to lock both of the lamp swinging members to their respective sleeves 20 fixed to the shanks of the lamp carrying members. When it is desired to disconnect both lamp carrying members from their swinging mechanism and at the same time, lock the said members against rotary movement, both of the bolts 23 are forced upwardly into position to lock the sleeves 20 of the lamp carrying members to the bearing supports, this operation of the bolts serving to release the lamp swinging members from the said sleeves of the lamp carrying members. If it is desired to connect one lamp to its swinging mechanism and keep the other lamp stationary, the locking bolt of the lamp bracket which is to be swung may be forced downwardly into position to lock its lamp swinging member to the lamp carrying member, while the other bolt may be retained in its position for locking the bracket, which is to be held stationary, to its bearing support.

It will be understood from the foregoing description that by changing the positions of the locking pins in the lamp brackets of a vehicle, either one of them may be caused to swing, by the operation of the steering gear, with the steering traction wheels; and by varying the adjustment of the rod 35 on the drop arm 4, the angle of movement of the brackets can be varied at will.

The lamp brackets may be provided with any suitable or approved form of lamps which may be supported by the bifurcated portions 7 of the lamp carrying members.

It is to be understood that I do not wish to confine myself strictly to the form herein shown and described, as changes may be made without departing from the spirit and scope of my invention.

What I claim is:

1. A vehicle steering gear, a lamp carrying member, a lamp swinging member, a rod connecting the steering gear with the lamp swinging member and means for locking the lamp swinging member to or releasing it from the lamp carrying member at pleasure.

2. A vehicle steering gear, lamp carrying members, lamp swinging members, a rod connecting the lamp swinging members, a rod connecting the steering gear with one lamp swinging member and means for locking each lamp swinging member to or releasing it from its corresponding lamp carrying member at pleasure.

3. A vehicle steering gear, a lamp carrying member, a bearing support therefor, a lamp swinging member, a rod connecting the steering gear with the lamp swinging member and means for locking the said lamp carrying member to the said bearing support or to the said lamp swinging member at pleasure.

4. A vehicle steering gear, lamp carrying members, bearing supports therefor, lamp swinging members, a rod connecting said lamp swinging members, a rod connecting the steering gear with one of the lamp swinging members and means for locking each of said lamp carrying members to its corresponding bearing support or lamp swinging member at pleasure.

5. A vehicle lamp bracket comprising a lamp carrying member, a bearing support therefor, a lamp swinging member and means for locking said lamp carrying member to said lamp swinging member or said bearing support.

6. A vehicle lamp bracket comprising a lamp carrying member, a bearing support therefor, a lamp swinging member and means for locking said lamp carrying member to said lamp swinging member or said bearing support or releasing said lamp carrying member from both the bearing support and the lamp swinging member.

7. A vehicle lamp bracket comprising a lamp carrying member, a bearing support having a tapered recess, a lamp swinging member also having a tapered recess, an intermediate sleeve fixed to the lamp carrying member and a locking bolt having tapered ends, said bolt being fitted to slide in said sleeve and having its tapered ends arranged to be brought into and out of their respective tapered recesses at pleasure.

8. A vehicle lamp bracket comprising a lamp carrying member, a bearing support having a tapered recess, a lamp swinging member also having a tapered recess, an intermediate sleeve fixed to the lamp carrying member and a locking bolt having tapered ends, said bolt being fitted to slide in said sleeve and having its tapered ends arranged to be brought into and out of their respective tapered recesses at pleasure, the said bolt being completely housed in said sleeve when in its intermediate position.

9. A vehicle lamp bracket comprising a lamp carrying member, a bearing support therefor, a lamp swinging member, a bolt for locking said lamp carrying member to said bearing support or said lamp swinging member and means tending to hold the locking bolt in either locking position.

10. A vehicle lamp bracket comprising a lamp carrying member, a bearing support therefor, a lamp swinging member, a bolt for locking said lamp carrying member to said bearing support or said lamp swinging member and spring-actuated means tending to hold the locking bolt in either locking position.

11. A vehicle lamp bracket comprising a lamp carrying member, a bearing support therefor, a lamp swinging member, a bolt for locking said lamp carrying member to said bearing support or said lamp swinging member and means tending to hold the locking bolt in either locking position, said means comprising a cam-faced housing for said bolt, an elongated slot in said housing, a handle extending from said bolt through said slot and a spring on said handle coacting with said cam face to force said handle into either end of the slot.

In testimony, that I claim the foregoing as my invention, I have signed my name in presence of two witnesses, this thirtieth day of December 1907.

GEORGE S. SHERMAN.

Witnesses:
F. GEORGE BARRY,
HENRY THIEME.